Patented Nov. 10, 1931

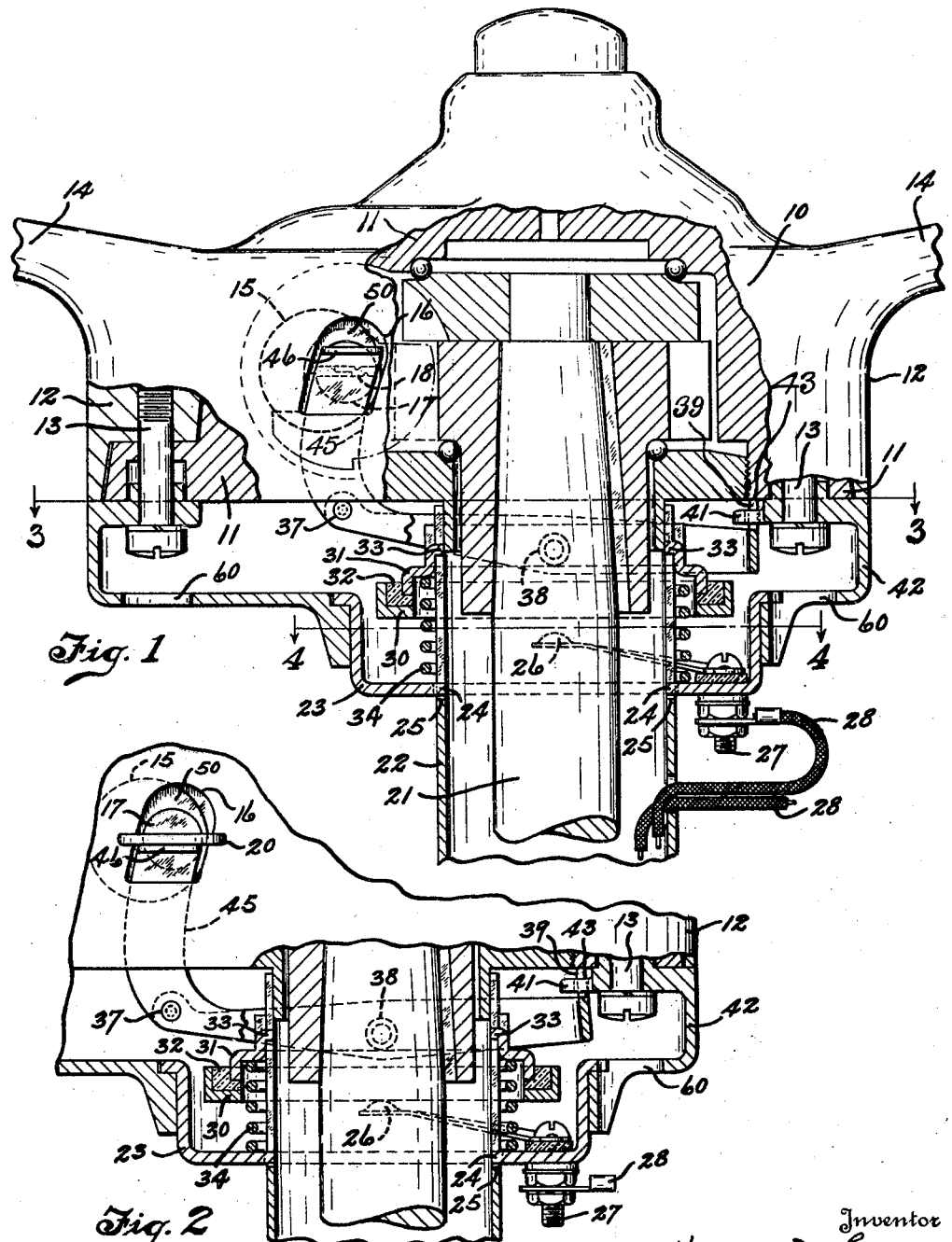

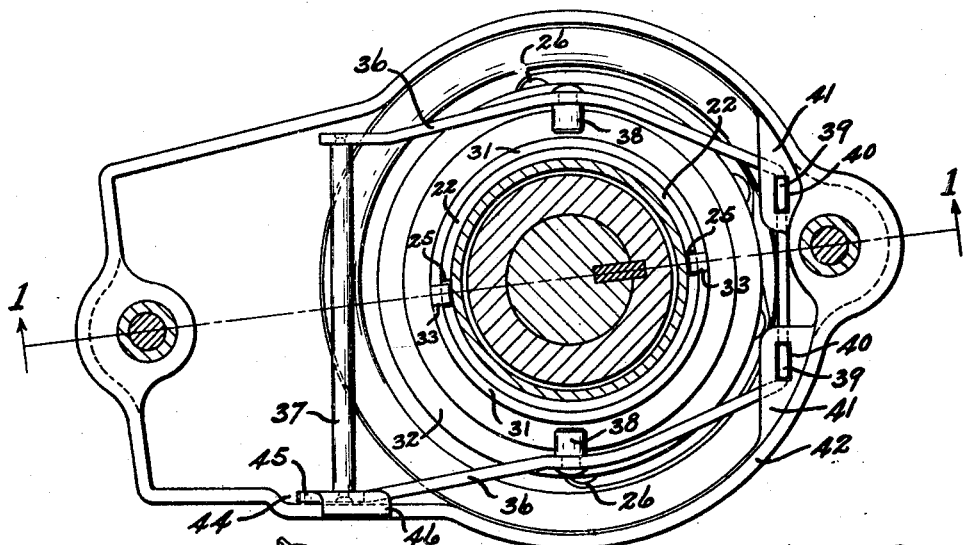
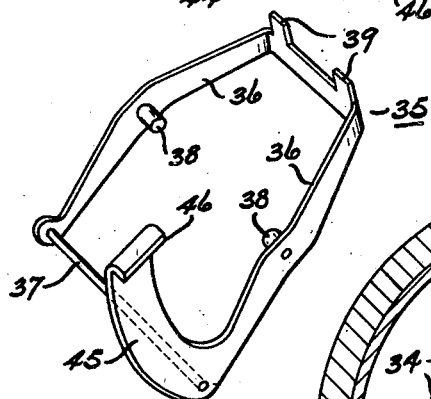
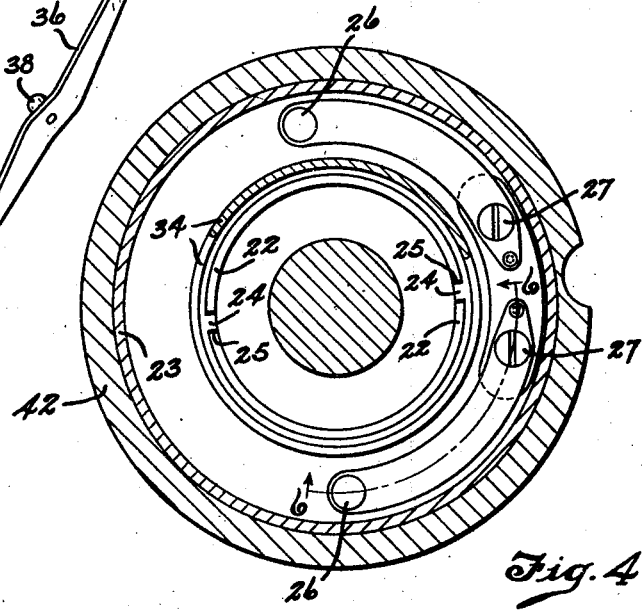
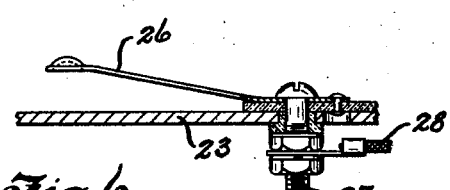

1,831,300

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

COORDINATED LOCKING STEERING WHEEL AND ENGINE IGNITION SWITCH

Application filed June 1, 1925. Serial No. 33,874.

This invention relates to theft proof devices for automotive vehicles and particularly to a locking steering wheel which requires the withdrawal of the lock key before the engine ignition may be turned off.

The combination of a lock steering wheel and ignition switch wherein the switch is turned off simultaneously with the locking of the steering wheel has been known heretofore. However in such prior devices it has been possible for the operator to stop the engine by turning the lock key and leaving the key in the keyway. A great many drivers will do just this when leaving the vehicle unattended for only a short time, and by so doing the theft proof feature of the device is obviously entirely overcome.

An object of this invention therefore is to provide a combination of a theft lock and ignition switch which will necessitate the locking of the theft lock and the withdrawal of the key before the ignition switch may be turned off. Such a device will obviously require the locking of the vehicle and the removal of the key every time the engine is stopped and therefore prevent careless drivers from leaving the car even for a short time in such a condition that a thief may drive it away.

A more specific object is to provide a combination of a locking steering wheel and an ignition switch which will require the steering wheel to be rendered completely inoperative before the ignition switch may be turned off.

Another object is to so coordinate the ignition switch and theft lock that the ignition switch is automatically turned off by the withdrawal of the key from the lock.

Another object is to eliminate sliding switch contacts when the steering wheel is turned for steering purposes during the driving of the car.

Further objects and advantages of the present invention will be apparent from the following description, reference being had to the accompanying drawings, wherein a preferred form of embodiment of the present invention is clearly shown.

In the drawings:

Fig. 1 shows a loose locking steering wheel and engine ignition switch made according to this invention. The switch mechanism is shown in section on line 1—1 of Fig. 3 and shows the parts in switch "off" position and the keyway in the wheel lock covered by the switch actuating lever.

Fig. 2 is a view similar to the lower part of Fig. 1 but shows the switch mechanism in switch "on" position and the key in the wheel lock.

Fig. 3 is a horizontal section on line 3—3 of Fig. 1 but shows the switch actuating lever in full.

Fig. 4 is a horizontal section on line 4—4 of Fig. 1.

Fig. 5 is a perspective view of the switch actuating lever.

Fig. 6 is a section on line 6—6 of Fig. 4 showing the stationary ignition switch contacts.

Like or similar reference characters refer to like or similar parts throughout the several views.

The particular kind of lock mechanism within the locking steering wheel hub 10 forms no part of the present invention and hence said mechanism has not been fully illustrated in this application. This particular lock mechanism whose outer view is shown in Fig. 1 is fully disclosed and claimed in a copending application, Serial No. 755,182, filed December 11, 1924, by Harvey D. Geyer and Alva W. Scott issued July 10, 1928, to Patent No. 1,676,465. This locking mechanism is all enclosed in an inner hardened steel protective shell 11 to which the outer casing 12 is bolted by the bolts 13. This casing 12 is preferably an aluminum casting which is integral with the spider arms 14 as clearly shown in Fig. 1. A cylinder lock 15, of any well known construction, is mounted in the steel protective shell 11 beneath the outer casing 12. This outer casing 12 is cut away at 16 to uncover the rotary barrel 17 having the key-way 18 therein, to permit the insertion of the key 20 in said key-way for the actuation of said barrel 17. When the key 20 is fully inserted in its key-way 18 it releases all the pin tumblers which hold barrel 17 against rotation, whereupon the spring urged locking bolt of the locking mechanism snaps over to fix the steering wheel in driving relation to its steering shaft 21.

The ignition switch mechanism will now be described. The steering shaft 21 is housed by a stationary tube or housing 22. A stationary cup 23 is mounted upon housing 22 and is held against relative rotation by two lugs 24 which rest at the bottom of two longitudinal slots 25 in housing 22 (see Figs. 1 and 4). Two stationary leaf spring contacts 26 are insulatedly mounted upon the bottom of cup 23 and held in place by the two contact terminal screws 27 which individually serve as the binding posts for the ignition circuit wires 28 leading to the stationary contacts 26 (see Fig. 6). The contact points of the contacts 26 are preferably arranged to lie diametrically opposed to each other (see Fig. 4). The movable contact ring 30 is insulatedly and reciprocably mounted above the contacts 26 so that when it is depressed it bridges across said contacts 26 and thus completes the ignition circuit through wires 28. This ring 30 is rigidly secured to a shouldered ring 31 but is insulated therefrom by the insulation ring 32. This shouldered ring 31 is provided with two inwardly turned lugs 33 which ride in the vertical slots 25 in the housing 22 and so prevent relative rotation of ring 31 and contact ring 30 rigidly attached thereto, but permit their vertical reciprocation as will be now described. The coil spring 34 engages the under side of shouldered ring 31 and urges it upwardly away from the contacts 26 as clearly shown in Fig. 1. A switch actuating lever (designated as a whole by numeral 35) engages the upper side of ring 31 and when depressed causes contact ring 30 to contact with the contacts 26. This lever 35 (see Fig. 5) is provided with two legs 36 extending on opposite sides of housing 22, the outer ends of said legs 36 being rigidly joined together by the cross rod 37 making a rigid construction. Each leg 36 has an inwardly extending lug 38 which engages the top side of shouldered ring 31 (see Figs. 1 and 3). The fulcrum end of lever 35 has two upwardly projecting extensions 39 which extend through two guide slots 40 provided in the short flanges 41 on casting 42 (to be later described). These extensions 39 contact against the bottom surface of the steel shell 11 at points 43 which thus act as pivot points for the lever 35. One leg 36 has an upward extension 45 which rides in a suitable clearance space 44 between the steel shell 11 and the side wall of the outer housing 12. This clearance space 44 is preferably formed by bulging out the side wall of 12 a short space from the shell 11 as clearly indicated in Fig. 3. This extension 45 covers the keyway 18 of the wheel with stationary contacts 26, but when lever 35 has been depressed to bring ring 30 into contact with contacts 26 the keyway 18 is uncovered, as will be obvious from comparing Figs. 1 and 2.

Preferably extension 45 has a short outwardly turned flange 46 at its top which enables lever 35 to be easily depressed by the tip end of the key 20 before said key is inserted in its keyway 18. When the lever 35 is in the position shown in Fig. 1, its upward movement due to the urge of coil spring 34 is limited by the cross rod 37 engaging the under side of shell 11, as clearly shown in Fig. 1.

This leaves a suitable opening 50 above the flange 46 into which the tip of key 20 is easily inserted by the operator to facilitate the depression of lever 35 by means of key 20. The operator merely presses upon the flange 45 with the tip of key 20 until keyway 18 is uncovered whereupon key 20 is easily inserted in its keyway as shown in Fig. 2. When flange 46 is in this position the ignition switch contacts 26 are bridged by the movable contact ring 30 and hence ignition is "on" and the engine may be started. When key 20 is turned, either by hand or by a spring urged locking bolt to render the steering wheel operative, the flange 46 is depressed still further by the camming action of the key, but it will be clear that this further movement of lever 35 acts only to slightly increase the contact pressure between contacts 26 and ring 30.

It will now be obvious that before the ignition may be turned "off" the key 20 must be again turned to position shown in Fig. 2, thus rendering the steering wheel inoperative by the movement of the locking bolt, and then withdrawn entirely from the keyway 18. The coil spring 34 then automatically moves ring 30 out of contact with contacts 26 and causes extension 45 of lever 35 to cover keyway 18. The automobile will now be safely locked against thieves and the driver will not be tempted to leave the key in its keyway since he has withdrawn it entirely clear of the lock.

The casting 42 serves as a housing for the switch mechanism and as a guide for the somewhat loosely mounted non-rotatable cup 23. This casting 42 is bolted to the wheel hub by the same bolts 13 which holds the aluminum housing 12 to the steel shell 11 (as clearly shown in the drawings). The round holes 60 in casting 42 are provided to permit the insertion and removal of the bolts 13 by means of a screw-driver, as will be readily understood.

An important feature of this switch mechanism is that there is no relative sliding between ring 30 and contacts 26 during rotation of the wheel for steering the car. The ring 31 is kept from rotating by the lugs 33 riding in vertical slots 25 in housing 22 as described hereinabove, while the lugs 38 on lever 35 slide around upon the shoulder on ring 31 when the steering wheel is rotated for steering purposes. This prevents constant wear on the switch contacts.

While the form of embodiment of the present invention as herein disclosed, constitutes a preferred form, it is to be understood that other forms might be adopted, all coming within the scope of the claims which follow.

What is claimed is as follows:

1. In a locking steering wheel mechanism for an automotive vehicle, in combination: a steering shaft, a steering wheel mounted upon said shaft, a key operated means for rendering said wheel either operative or inoperative to drive said shaft, a removable key for actuating said means, an electric switch mounted adjacent said shaft, and means for actuating said switch, said actuating means being engaged by the key in said key operated means and held in switch-closed position by said key in all rotary positions thereof whereby the opening of said switch is prevented until said key is withdrawn from said key operated means.

2. In a locking steering wheel mechanism for an automotive vehicle, in combination: a steering shaft, a steering wheel mounted upon said shaft, a key operated means for rendering said wheel either operative or inoperative to drive said shaft, a removable key for actuating said means, an electric switch mounted adjacent said shaft, and means for actuating said switch, said actuating means being engaged by the key in said key operated means and held in switch-closed position by said key in all rotary positions thereof, and automatically movable to switch open position when the key is withdrawn from said key operated means.

3. In an engine driven vehicle, in combination, a steering wheel, a lock operable by a key for rendering said wheel operative or inoperative, an engine ignition switch associated with said wheel, actuating means for said switch, said actuating means being arranged to cover the keyway in said lock when the ignition switch is in "off" position and movable by said key to "on" position before said key may be inserted in its keyway in the lock.

4. In an engine driven vehicle, in combination, a steering wheel, a lock operable by a removable key for rendering said wheel operative or inoperative, an engine ignition switch associated with said wheel, an actuating lever for said switch, said actuating lever being engaged by said key at all times when in said lock and held thereby in "on" position whereby the ignition switch may not be turned "off" until said key is withdrawn from the lock.

5. In an engine driven vehicle, in combination, an operating mechanism, a lock operable by a removable key for rendering said mechanism either operative or inoperative, an engine ignition switch associated with said lock, and means for actuating said switch, said actuating means being directly engaged by the key in said lock and held in switch closed position directly by said key in all rotary positions thereof whereby the opening of said switch is prevented until said key is withdrawn from said lock.

In testimony whereof I hereto affix my signature.

HARVEY D. GEYER.